Mar. 13, 1923. 1,448,438
G. B. EGGERT
MIXING AND KNEADING MACHINE
Filed Nov. 30, 1921 2 sheets-sheet 1
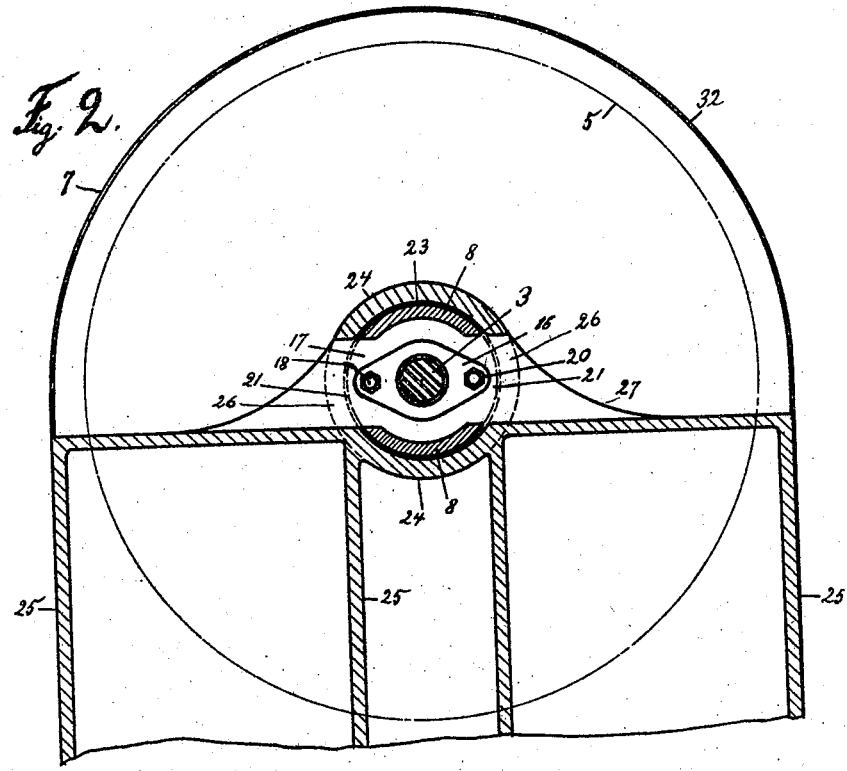
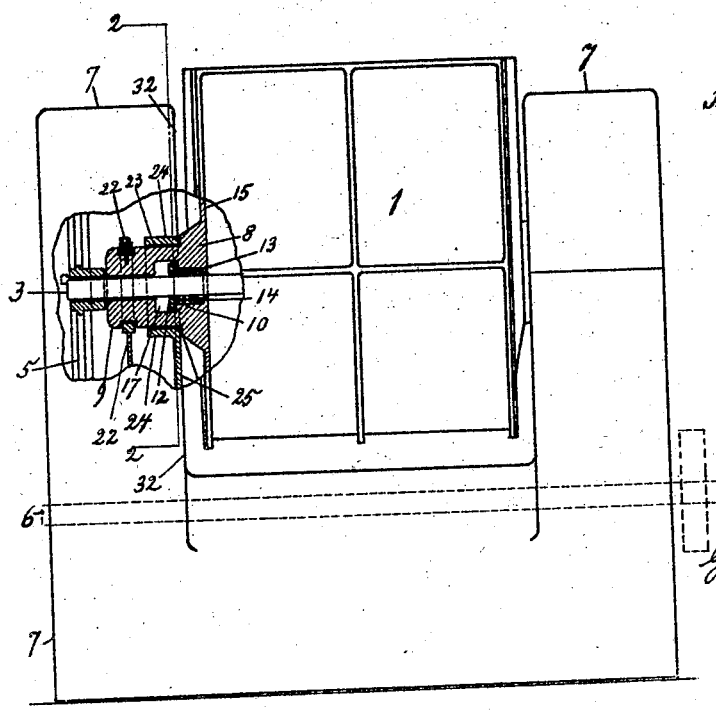
INVENTOR
Gustav Bernhard Eggert Mar. 13, 1923. 1,448,438
G. B. EGGERT
MIXING AND KNEADING MACHINE
Filed Nov. 30, 1921  2 sheets-sheet 2
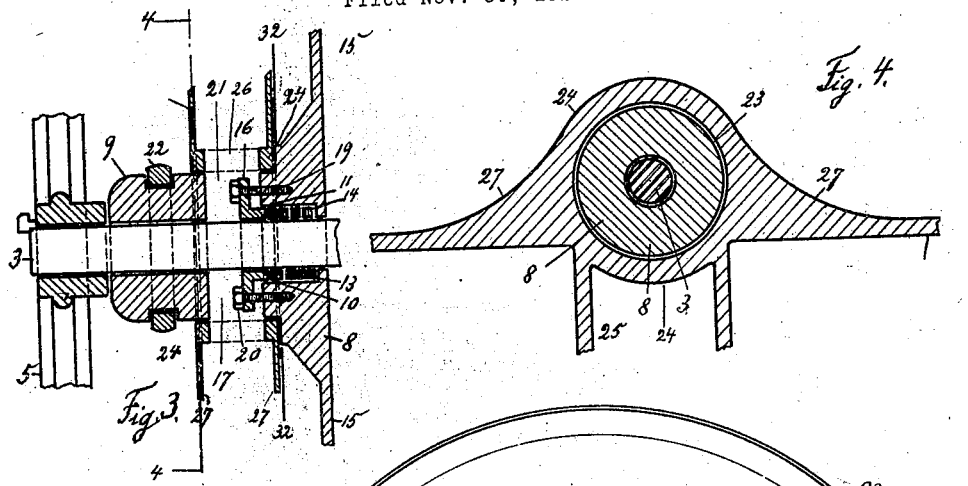
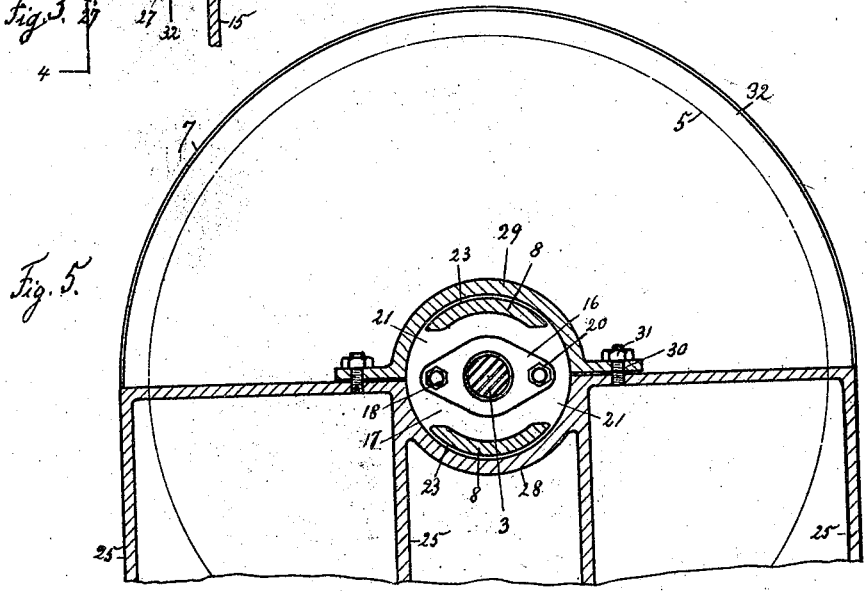
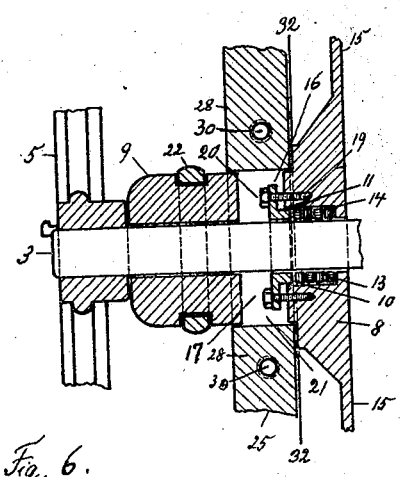
INVENTOR
Gustav Bernhard Eggert Patented Mar. 13, 1923.

1,448,438

UNITED STATES PATENT OFFICE.

GUSTAV BERNHARD EGGERT, OF SAGINAW, MICHIGAN, ASSIGNOR TO BAKER-PERKINS MANUFACTURING CORPORATION, OF SAGINAW, MICHIGAN, A CORPORATION OF NEW YORK.

MIXING AND KNEADING MACHINE.

Application filed November 30, 1921. Serial No. 518,877.

*To all whom it may concern:*

Be it known that I, GUSTAV BERNHARD EGGERT, a citizen of the United States, residing at Saginaw, in the county of Saginaw and State of Michigan, have invented new and useful Improvements in Mixing and Kneading Machines, of which the following is a specification.

My invention relates to those kinds of mixing and kneading machines in which the materials to be mixed are placed in a trough, barrel or the like (hereinafter called in general "trough"), treated therein by blades, rods, vanes or similar mixing devices fixed to a rotating shaft or shafts (hereinafter called in general "mixing shafts"), and, after the operation has been completed, removed from the trough by tilting it. The purpose of my invention is to construct these machines so as to be more compact, to shorten all the various shafts used, thereby diminishing the stress therein, to protect all the parts of the gearing against dust and splashings, and to save a considerable amount of construction materials and of floorspace.

To this end, I provide the trough at that point of its wall, through which a mixing shaft passes, with a hub surrounding the part of the latter projecting from the trough. The outer end—farthest away from the trough wall—of the hub is solid and acts as bearing for the mixing shaft, while the rest contains a large cavity suitable in shape and dimensions to form part of a stuffing box and to receive its gland. For this purpose, the cavity is composed nearest to the trough wall, which closely surrounds the mixing shaft, of a cylindrical part forming round the latter an annular space adapted to receive the packing, and between this annular space and the solid outer end of the hub of a wider chamber containing the gland and fastenings of the stuffing box. This chamber is provided with one or more openings suitable to introduce therethrough the gland which must be in position therein to slip over the shaft, when the latter is pushed through the hub at the assembling of the machine. The chamber and the opening therein are of such a width and shape and so arranged that the screws pressing the gland down on the packing can be conveniently and effectively worked, and the latter can be easily renewed. In order to facilitate these operations, I preferably provide two openings directly opposite to each other in the wall of the gland chamber. The outer surface of that part of the hub surrounding the gland chamber and overlapping the openings therein is formed as a cylinder coaxial to the shaft, and turns in a bearing forming wholly or partly one piece with or rigidly fixed to the framework of the machine. This bearing is so constructed and arranged that access can be easily had to the openings in the gland chamber and thus to the gland itself and its screws for tightening the latter and for renewing the packing. In cases where the bearing forms a single annular piece, suitable openings are provided therein corresponding to the openings in the gland chamber, and, where it is more convenient to use a split bearing, easy access to the stuffing box is obtained by removing the cap of the bearing and by turning the trough and therewith the hub and its side openings so that the latter are in line with the open space made by the removal of the cap. The lever, by means of which the trough is tilted, is fixed to the outer solid end part of the hub, and the gear wheel, by means of which the mixing shaft is rotated, is mounted on that part of the latter protruding from the same end of the hub.

The main consequence of the construction forming the object of my invention is that the various gearings working the mixing blades and tilting the trough are placed much nearer to the latter, and that thus shorter shaftings may be used throughout, and the width of the framework supporting the machine is greatly decreased. For keeping the gearing quite free from dust, splashings and the like unavoidably arising in mixing operations and for the safety of the attendant, I enclose in this kind of machines all the moving parts, their bearings and the framework supporting them in a tightly closed guard box composed of a lower part, either cast in one piece with the framework or consisting of plates fixed to the same, and of an upper curved hood resting on and suitably fastened to the lower part: according to my invention I arrange the side wall of the guard box nearest to the trough closely along the side of the bearing in which the hub turns, and, thus enclosing this bearing as well as the stuffing box contained therein, I attain for these parts the same protection.

The annexed drawings, representing examples of the application of my invention, serve for more fully explaining its novel features and devices.

Fig. 1 represents a side view of the machine, partly broken away; in the exposed part a vertical section through the axis of a mixing shaft is shown, demonstrating the position and arrangement of the stuffing box, of the hub, of the driving wheel, and of the bearings and other appendages. Fig. 2 is a vertical cross section on line 2—2 of Fig. 1, and Fig. 3 a horizontal section through the axis of a mixing shaft of the construction in which the bearing of the hub consists of one piece; Fig. 4 is a section on line 4—4 of Fig. 3.

Fig. 5 is a vertical cross section on line 2—2 of Fig. 1 and Fig. 6 a horizontal section through the axis of a mixing shaft, when a split bearing is used for the hub.

Like numerals of reference denote corresponding parts serving the same or a similar purpose.

In the drawings the numeral 1 indicates the mixing trough, 3 the mixing shaft, 5 the gear wheel mounted on the same, 6 the main driving shaft of the machine, and 7 the U-shaped guard box enclosing all its gearings and the framework supporting it. The trough 1 is mounted between the two wings of the box 7. The hub 8, shown as cast in one piece with the side wall of the trough 1, forms in its solid outer part the bearing 9 for the shaft 3, and contains in its hollow part arranged nearest to the trough 1 the stuffing box 10. The annular part 11 of the gland 12 of the latter and the packing 13 are placed in the corresponding cavity 14 ending on the side wall 15 of the trough 1, which wall closely surrounds the shaft 3. The elliptical top 16 of the gland 12 is contained in the gland chamber consisting of the wider cavity 17 of the hub 8, and is provided with the apertures 18. The set screws 19, arranged in the side wall of the cavity 17 in correspondence with the apertures 18, and the screw nuts 20 meshing with the screws 19 serve to compress the packing 13, thus tightening the stuffing box. The cavity 17 is provided with the two opposite openings 21, through which the gland 12 is introduced into the same, and the attendant has access to the stuffing box 10. The gear wheel 5 is rigidly mounted on the end of the shaft 3 protruding from the outer solid end part of the hub 8. The same part of the hub has rigidly affixed at its circumference the lever arrangement 22 serving to tip the trough 1 over in order to empty it. For this purpose the hub 8 turns on its cylindrical middle part 23 in the bearing 24 forming one piece with or rigidly fixed to the framework 25 supporting the machine. The openings 21 are situated in the cylindrical part 23 of the hub, and the bearing 24 is made so broad that it not only covers, but amply overlaps the openings 21. In the Figs. 2, 3 and 4 the bearing 24 is represented as a complete ring forming one piece with the framework 25; in this case, two opposite openings 26 are arranged therein in correspondence with the openings 21 in order to have access to the stuffing box 10 in the cavity 17, and wings 27 are provided for strengthening the sides of the bearing.

In the modification shown in Figs. 5 and 6 the bearing 24 consists of two parts, the base 28 forming one piece with the framework 25, and the cap 29 fastened on the base by means of the set screws 30 and nuts 31. When the stuffing box 10 is to be attended to, the cap 29 is removed, and, if necessary, the trough 1 slightly turned, until one or other of the openings 21 is completely contained within the open space made by the removal of the cap 29.

The hood forming the upper part of the guard box 7 rests on and is suitably and removably fixed to the top of the framework 25. Always the side walls 32 of the guard box 7,—those of the hood as well as those arranged at the framework 25—run closely along the side, nearest to the trough 1, of the bearing 24, the box thus giving protection also to the bearings, the open parts of the hub and the stuffing box therein.

I claim:

1. In a machine of the kind described, in combination a mixing trough a mixing shaft projecting from the same, a hub arranged on the outside of said trough round the said shaft, a bearing provided for the latter in that part of the said hub farthest away from the said trough, a stuffing box for the said shaft, a gland belonging to the said stuffing box, a cavity provided for the said stuffing box in the said hub between the said bearing and the trough wall closely surrounding the said shaft, an opening provided in the outer wall of the said cavity suitable for introducing the said gland and adjusting the packing of the said stuffing box, framework supporting the machine, a bearing arranged thereon for the said hub to turn in and being of such a width as to cover and overlap the sides of the said opening therein and thereby covering the said stuffing box and gland, and means arranged in this bearing for having free access to the said opening when required.

2. In a machine of the kind described, in combination a trough, a mixing shaft protruding from the latter, a hollow, cylindrical hub fixed to the said trough and revolubly carrying the said shaft, a stuffing box arranged in the cavity of the said hollow hub and adapted to prevent leakage round the said shaft from and into the said trough, openings provided in the wall of the said hollow hub so as to give access to the said stuffing box, a bearing consisting of a single annular piece, rigidly fixed on the framework of the machine and revolubly carrying the said hub, and openings in the said bearing corresponding to those in the wall of the said hub.

3. In a machine of the kind described, in combination a trough, a mixing shaft protruding from the latter, a hollow cylindrical hub fixed to the said trough and revolubly carrying the said shaft, a stuffing box arranged in the cavity of the said hollow hub and adapted to prevent leakage round the shaft from and into the said trough, openings provided in the wall of the said hollow hub so as to give access to the said stuffing box, and a bearing revolubly carrying the said hub and consisting of a base rigidly fixed on the framework of the machine and of a cap removably fastened to the base, the width of the said bearing being such as to cover and overlap the said openings in the said hub.

4. In a machine of the kind described, in combination a trough, a rotary mixing shaft protruding from the latter, a hub surrounding the said shaft and consisting of a solid front part containing the bearings for the latter, of a solid back part fixed to the wall of the said trough and forming with this wall round the said shaft the annular chamber for the packing of a stuffing box, and of a hollow, cylindrical middle part, the cavity of which encloses the gland of the latter and the screws holding the same against the aforenamed solid back part, openings provided in the wall of this cavity so as to give access to the stuffing box therein for adjusting the same, a bearing fixed to the framework of the machine for the said hub to turn in, its width corresponding to that of the cylindrical middle part of the latter, means provided at the said bearing so as to give access to the said openings and thus to the stuffing box in the said hub, and means mounted on the front part of the latter and adapted to turn the said hub and thus to tilt the said trough.

GUSTAV BERNHARD EGGERT.